April 25, 1967          C. E. WELCH, JR          3,316,164
ETCHING OF ALUMINUM FOIL
Filed April 23, 1964
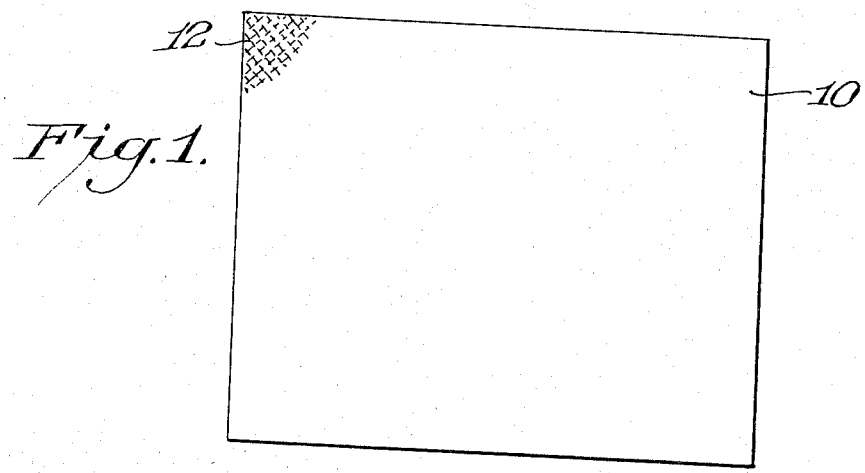
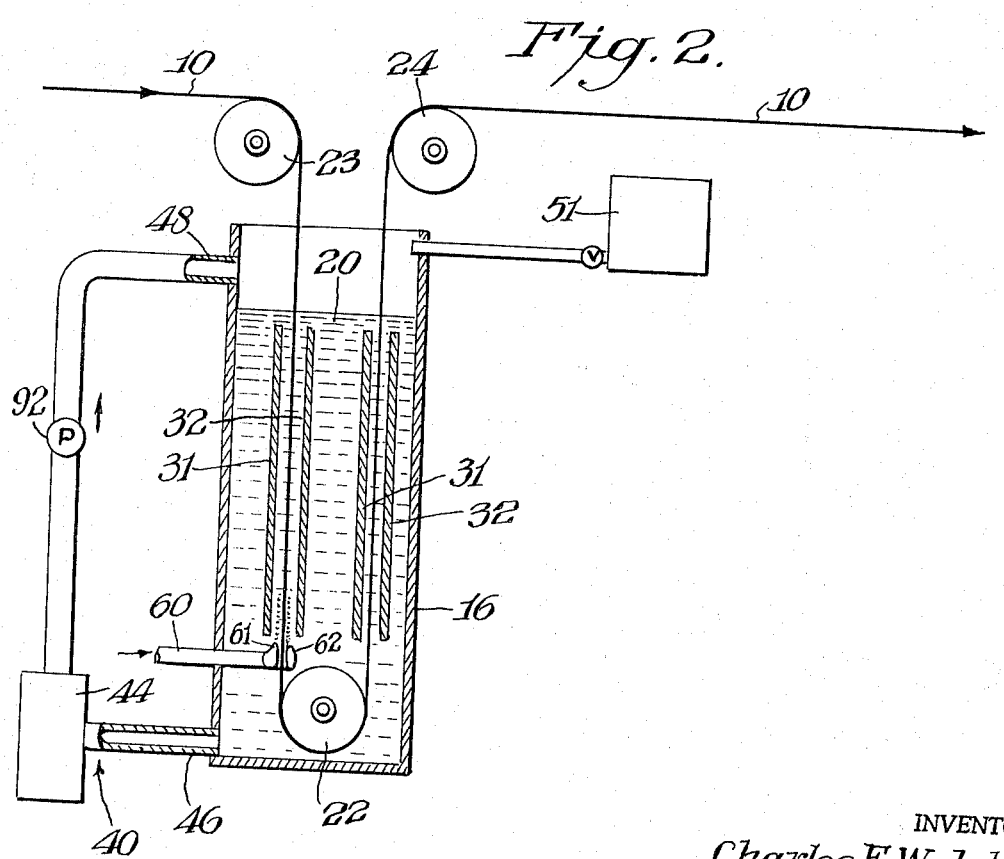
INVENTOR
Charles E. Welch, Jr.
BY Connolly and Hutz
ATTORNEYS

United States Patent Office 3,316,164
Patented Apr. 25, 1967

3,316,164
ETCHING OF ALUMINUM FOIL
Charles E. Welch, Jr., Williamstown, Mass., assignor to Sprague Electric Company, North Adams, Mass., a corporation of Massachusetts
Filed Apr. 23, 1964, Ser. No. 362,065
9 Claims. (Cl. 204—141)

This invention relates to etching of aluminum foil, and more particularly to a process for electrolytic etching of aluminum foil for use as electrodes of an electrolytic capacitor.

It is well known in the electrolytic capacitor art to increase the surface area of foil to be employed for either or both anode and cathode eelctrodes by an etching operation. The true worth of an etching process is determined after an oxide has been "formed" over the etched surface. Inasmuch as the voltage at which an oxide is formed determines how much of an etched surface is filled-in or smoothed out, different etch structures have been recognized as being advisable for capacitors that are to be operated at low voltages (under 200 v.) and those to be operated at high voltages. It has been determined that a high "etch ratio" (capacitance gain) in low voltage capacitors is attainable by providing the foil with an etch structure that is characterized by a very large number of shallow etch pits that are uniformly distributed over the foil surface. Known processes that have sought to attain the desired quality and uniformity of etched foil for low voltage electrolytic capacitors have not fully realized their objectives.

Prior art processes for etching capacitor-grade aluminum foil have generally employed a bath of an aqueous solution of sodium chloride. These prior art processes enjoy limited success but suffer from the need for considerable maintenance because of the precipitation of aluminum hydroxide, or oxide hydrate, which adheres to the cathodes of the etching equipment.

An object of this invention is a process that overcomes the above and related disadvantages of the prior art.

Another object of the present invention is the provision of a novel process for etching capacitor-grade aluminum foil, which process is relatively simple to carry out.

Additional objects of the present invention include the provision of novel etched aluminum foil of superior properties for use as electrodes in low voltage electrolytic capacitors.

The foregoing as well as still further objects of the present invention will be more fully appreciated from the following description of several of its exemplifications, reference being made to the accompanying drawing wherein:

FIGURE 1 illustrates a length of aluminum foil etched in accordance with the present invention; and FIGURE 2 is a vertical sectional view of an arrangement for carrying out the etching of the present invention.

It has been discovered that highly desirable etching of aluminum foil is readily effected by subjecting the foil to anodic treatment in an aqueous solution of at least 200 grams NaCl per liter and containing 10 to 20 grams $NaHSO_4$, the solution being maintained at a pH between about 0.5 and 2.8 by the addition of $H_2SO_4$, the treatment being carried out at a temperature of from 85 to 100° C. and with an anodic current density of from about 5 to 10 amperes per square inch.

The etched aluminum foil produced in the above manner by treatment at a coulombic value of from 4 to 6 ampere-minutes per square inch has a very high etch ratio, particularly when the ratio is measured by the capacitance at 200 volts or less of an electrolytic capacitor having the etched aluminum foil as its anode.

The preferred processed conditions giving the largest etch ratios to capacitor-grade (at least 99.80% purity) aluminum foil with fewest processing difficulties include an NaCl concentration of between 225 and 250 grams per liter together with 15 to 20 grams of $NaHSO_4$, and maintaining a pH of from 1.5 to 2.5 by addition of $H_2SO_4$, with a solution temperature of about 95° C. and an anodic current density of 7 to 7.5 amperes per square inch, for a total treatment of 5 to 5.5 ampere-minutes per square inch.

The foregoing etching gives even better results when the bath also contains some dissolved aluminum, as by incorporating in the fresh solution about 2.5 grams per liter of dissolved aluminum, either in the form of an aluminum salt, such as aluminum chloride, or by adding some used etching bath. The addition of about 25 lbs. of $AlCl_3$ per 500 gallons of etching solution permits the immediate attainment of the desired etching.

It has been further discovered that etch ratios not heretofore available for low voltage capacitors are obtained when the foregoing etching is carried out while bubbling through the etching solution a stream of gas, such as nitrogen, inert to the materials present. The use of nitrogen gives about 7 to 10% higher capacitance gain and a more uniform etch. The explanation for this improvement is not fully understood, but it is believed that the inert gas bubbling flushes out some of the hydrogen formed on the surface of the aluminum during the etching. Passing the nitrogen along the surface of the foil within the etching solution appears to physically displace the hydrogen clinging to the aluminum surface during etching, thereby permitting more of that surface to be attacked. The bubbling of oxygen through the etching solution will cause the etched aluminum surface to become oxidized, so that oxygen is not considered an inert bubbling gas for this aspect of the process.

As the etching solutions of the present invention are used, they begin to deposit a hydrated aluminum sulfate as a fine, dense precipitate which is easily removed by filtration, settling or centrifugation. The solution otherwise remains clear, and the precipitate does not tend to gum up or otherwise interfere with the operation of the etching equipment or the progress of the etching, so that intermittent or continuous separation of the precipitate by any suitable technique will keep the solution in use indefinitely so long as the pH and the ingredient concentration limits are not exceeded. Intermittent or continuous addition of $H_2SO_4$ effectively maintains the pH and similar additions of $NaHSO_4$ maintains the concentration of that ingredient. The NaCl concentration does not appear to be diminished by the etching so there is no fundamental need to add make-up NaCl.

If the pH is permitted to exceed the upper limit of 2.8, the precipitate of aluminum hydroxide or oxide hydrate, that has been described above as a major shortcoming of prior art processes, starts to form. In a like manner, maintainance of sodium bisulfate within the perscribed limits is necessary to prevent depletion of sodium chloride and resultant formation of HCl gas and excess $Na_2SO_4$.

For prolonged use it has been found best to use nickel cathodes as counterelectrodes for the etching. Nickel also seems to be the most desirable metal used for any surface in contact with the etching solution of this invention other than the aluminum foil to be etched. Even stainless steels that have been used in the art will gradually dissolve and accumulate a smut.

Turning now to the drawings, FIGURE 1 shows a length of aluminum foil 10 with a portion 12 that has been etched in accordance with the present invention. The etch structure is a very uniform concentrated collection of fairly shallow pits, each having irregular lateral extensions.

FIGURE 2 illustrates the etching apparatus. A tank 6 contains a body of etching bath 20 through which a length of foil 10 is passed. The foil 10 enters the bath after sliding over electrical contact shoe 23 and is looped under a submerged roller 22 and then emerges from the bath to pass over electrical contact shoe 24 from which it can be pulled onto a take-up roll (not shown).

Within the body of etching bath 20, two pairs of cathode plates 31, 32 are placed adjacent the respective faces of the foil 10 and connected to the cathode of a source of D.C. electrical potential. The anode terminal of the source is connected to shoes 23 and 24 to complete the etching circuit.

A recirculation loop 40, including a pump 42 and settling chamber 44 has an intake conduit 46 opening near the bottom of tank 16, and a discharge conduit 48 emptying into the upper portion of the tank. By continuous or intermittent operation of the pump 42, an electrolyte is passed through the recirculation loop to permit precipitates to settle in the settling chamber 44 as the bath recirculates. The chamber can be replaced when it fills with precipitate.

Make-up tank 51 is connected through a valved line to replace the $H_2SO_4$ and $NaHSO_4$ that are removed by the etching and by precipitation as well as any drag-out. It has been found that effective control of the etching is accomplished by replenishing the sodium bisulfate and the sulfuric acid at a ratio of about 1.2 to 1.3 parts of the bisulfate to 1 part of the acid.

A bubbler conduit 60 passes through the wall of the tank 16 and has bubbling manifolds 61, 62 extending across the respective faces of the foil 10 and immediately adjacent thereto just below the lower ends of the cathodes 31, 32. By this arrangement the bubbles introduced through the bubbling conduit rise up alongside each face of foil 10 as the etching of these faces progresses. Although only one bubbler 60 is shown for simplicity of illustration, a second bubbler is contemplated beneath the second set of cathode plates 31, 32.

The entire contents of the tank 16 are maintained at a relatively high constant temperture as by coils, not shown. The passing of a coolant through the coils overcomes the exothermic heat of the etching and maintains the desired etching temperature of about 95° C.

The upper end of tank 16 can be connected to a condenser for condensing and returning water vapor liberated during use. Large quantities of hydrogen are evolved at the cathodes 31, 32 and this hydrogen along with the bubbling gas, which is preferably nitrogen, can be discharged to the atmosphere if desired. Alternatively, the evolved gases can be led to a recovery apparatus where the hydrogen and other ingredients can be separated. When bubbling is carried out through the bubbling conduit, it is important to have the bubbling arranged so that the bubbles move upwardly along a vertically extending portion of the foil being etched, as shown in FIGURE 2. It is this flow of bubbling gas along the vertical surfaces of foil 10 that best dislodges the hydrogen gas from the surfaces of the foil.

The tank 16 can be made of electrically non-conductive material such as plastic, or it can be made of nickel. The same construction materials can be used for the submerged roller 22, bubbler conduit 60 and the recirculation loop. As with the contacting shoe 24, the cathodes 31, 32 are made of nickel. Care should also be taken that make-up tanks and their supply conduits do not introduce any contamination into the etching bath, and for this reason should be made of the same materials as the tank itself.

The following example is typical of the present invention:

*Bath composition*

| | Grams per liter |
|---|---|
| Sodium bisulfate | 18 |
| Sodium chloride | 225 |
| Sulfuric acid to lower the pH to 2.0. | |

*Bath conditions*

| | |
|---|---|
| Bath temperature | 95° C. |
| Anode current density | 7.4 amperes per square inch. |
| Overall treatment | 5.5 ampere-minutes per square inch. |

As soon as etching is started in the above bath, the pH tends to increase rapidly and more sulfuric acid and sodium bisulfate are added fairly rapidly to hold the pH to 2.0 The pH change then stabilizes itself so that only a slow addition is needed. The additions can be made automatic by inserting a pH measuring device such as a glass electrode in the bath and using the output of the measuring device to control out-flow from a supply tank. The make-up of tank 51 for this example is 1.27 parts of sodium bisulfate to 1 part of sulfuric acid to provide a drip of about 150 cc. per minute of the bisulfate to about 125 cc. per minute of the acid.

By maintaining the bath composition and pH within the defined limits the only precipitate is a hydrated aluminum sulfate ion from the bath. The etch of this invention removes about 30% of the aluminum foil in obtaining the desired etch structure. The precipitate is relatively fine and dense and settles out readily. So long as the settled-out portions of the precipitate do not build up to the point where they interfere with the mechanical movements of the bath, the etching can be maintained.

The sodium chloride content of the bath does not ordinarily need replenishment provided the pH and sodium bisulfate levels are maintained, inasmuch as the only loss of the NaCl is by drag-out, which is very small.

The foil etched makes very good anodes for low voltage electrolytic capacitors when the foil is at least 99.93% aluminum and about 2 to 4 mils thick. It is advisable to clean the foil before etching as by passing it through an aqueous 0.45 N NaOH bath at 40° C. The cleaned aluminum is then rinsed, etched, again rinsed, this time with de-ionized or distilled water, and then it can be subjected to the oxide coating "formation" that converts the etched foil to such capacitor anodes. Typical oxide formations are described in U.S. Letters Patent 2,932,153.

Foils of lower purity aluminum can also be effectively etched in accordance with the present invention. For example, foils of 99.80% purity which are required for cathodes in some electrolytic capacitors are provided with at least twenty times normal surface area when etched according to this invention.

The formation of precipitate does not generally commence in a fresh bath until its content of aluminum ions builds up. This may take several days, and during such time the etch ratios achieved by the etching is not quite as large as obtained afterwards. It is helpful to start with a bath that contains at least about 2.5 grams of dissolved aluminum per liter inasmuch as such a bath gives best results right from the start. The dissolved aluminum can be provided by dissolving an aluminum salt such as aluminum chloride in the bath, or by adding to the bath a quantity of used bath.

With aluminum originally present, precipitation begins shortly after etching is started. The precipitate can be removed by centrifugation or filtering in place of or in combination with the settling described above.

It is a feature of the present invention that aluminum foil etched with the bubbling can attain a capacitance value as high as 120 mfd. from a 6 square inch sample when measured after "formation" and in an electrolytic capacitor operated at 20 volts. Such a high value is obtained over the entire range of preferred etching conditions as described above. Outside the preferred range very good results are also obtained so long as the etching is within the broadest range of operating conditions.

Obviously many modifications and variations of the present invention are possible in the light of the above teachings. It is, therefore, to be understood that within

What is claimed is:

1. A process for electrolytically etching aluminum foil which process comprises subjecting the aluminum foil to anodic treatment in an aqueous solution consisting essentially of 10 to 20 grams $NaHSO_4$ and at least 200 grams NaCl per liter, the solution being at a pH between about 0.5 and 2.8, and the treatment being carried out at a temperature of from 85 to 100° C. and with an anodic current density of from about 5 to 10 amperes per square inch.

2. The process of claim 1 in which the aluminum foil is subjected to from about 4 to 6 ampere-minutes of the anodic treatment per square inch.

3. The process of claim 1 in which the aluminum has a purity of at least 99.80%, the $NaHSO_4$ concentration is about 18 grams per liter, the pH is about 1.5 to 2.5, the 225 to 250 grams per liter, the pH is about 1.5 to 2.5, the temperature about 95° C., the anodic current density about 7 to 7.5 amperes per square inch and the aluminum foil is subjected to about 5 to 5.5 ampere-minutes of the anodic treatment per square inch.

4. The process of claim 1 in which the solution also contains at least about 2.5 grams of dissolved aluminum per liter.

5. The process of claim 1 in which during the etching treatment there is bubbled through the solution along a vertical surface of said aluminum foil a gas inert to the materials present.

6. The process of claim 1 in which the pH is continuously measured and is maintained substantially constant by the addition of $H_2SO_4$.

7. A continuous process for electrolytically etching aluminum foil which process comprises passing an elongated strip of aluminum foil through an aqueous solution consisting essentially of 10 to 20 grams $NaHSO_4$ and at least 200 grams NaCl per liter, the solution being maintained at a pH between about 0.5 and 2.8 and a temperature of from 85 to 100° C., and subjecting the foil while in the solution to an anodic current density of from about 5 to 10 amperes per square inch to give it an anodic treatment of from about 4 to 6 ampere-minutes per square inch of foil surface.

8. The process of claim 7 in which sulfuric acid and sodium bisulfate are gradually added to the solution as needed.

9. Aluminum foil treated by the process of claim 5.

References Cited by the Examiner

UNITED STATES PATENTS

| | | | |
|---|---|---|---|
| 2,755,238 | 7/1956 | Turner | 204—141 |
| 2,930,741 | 3/1960 | Burger et al. | 204—141 |

FOREIGN PATENTS

| | | |
|---|---|---|
| 840,385 | 1/1939 | France. |
| 962,621 | 6/1957 | Germany. |
| 467,024 | 6/1937 | Great Britain. |
| 985,024 | 3/1965 | Great Britain. |

JOHN H. MACK, *Primary Examiner.*

R. MIHALEK, *Assistant Examiner.*

UNITED STATES PATENT OFFICE
CERTIFICATE OF CORRECTION

Patent No. 3,316,164                                      April 25, 1967

Charles E. Welch, Jr.

It is hereby certified that error appears in the above numbered patent requiring correction and that the said Letters Patent should read as corrected below.

Column 5, line 18, strike out "the pH is about 1.5 to 2.5 the" and insert instead -- the NaCl concentration is from --.

Signed and sealed this 21st day of November 1967.

(SEAL)
Attest:

Edward M. Fletcher, Jr.                                EDWARD J. BRENNER

Attesting Officer                                                Commissioner of Patents